US008135031B2

(12) United States Patent
Vimpari et al.

(10) Patent No.: US 8,135,031 B2
(45) Date of Patent: Mar. 13, 2012

(54) METHOD AND DEVICE FOR WIRELESS TRANSMISSIONS OF INTERNET PROTOCOL TV

(75) Inventors: Markku Vimpari, Oulu (FI); Keijo Lahetkangas, Oulu (FI)

(73) Assignee: Nokia Corporation, Espoo (FI)

( * ) Notice: Subject to any disclaimer, the term of this patent is extended or adjusted under 35 U.S.C. 154(b) by 378 days.

(21) Appl. No.: 12/308,337

(22) PCT Filed: Jun. 14, 2006

(86) PCT No.: PCT/IB2006/001586
§ 371 (c)(1),
(2), (4) Date: Dec. 11, 2008

(87) PCT Pub. No.: WO2007/144682
PCT Pub. Date: Dec. 21, 2007

(65) Prior Publication Data
US 2010/0242075 A1    Sep. 23, 2010

(51) Int. Cl.
*H04J 3/22* (2006.01)
*H04N 7/173* (2011.01)
(52) U.S. Cl. .......... 370/467; 725/87; 725/105; 370/400; 370/432

(58) Field of Classification Search .......... 370/351, 370/389, 390, 392, 400, 431, 432, 464–467; 725/74, 86, 87, 98, 105
See application file for complete search history.

(56) References Cited

U.S. PATENT DOCUMENTS

| 7,184,433 | B1 * | 2/2007 | Oz ................................. 370/389 |
| 7,529,241 | B2 * | 5/2009 | Milligan et al. ............... 370/390 |
| 7,710,961 | B2 * | 5/2010 | Miller et al. ................... 370/390 |
| 7,827,304 | B2 * | 11/2010 | Park et al. ...................... 370/351 |
| 2001/0009554 | A1 | 7/2001 | Katseff et al. |
| 2003/0021291 | A1 | 1/2003 | White et al. |
| 2004/0170159 | A1 * | 9/2004 | Kim et al. ...................... 370/352 |
| 2005/0055724 | A1 | 3/2005 | Atad et al. |

* cited by examiner

*Primary Examiner* — Aung S Moe
*Assistant Examiner* — Kerri Rose
(74) *Attorney, Agent, or Firm* — Alfred A. Fressola; Ware, Fressola, Van Der Sluys & Adolphson LLP

(57) ABSTRACT

The invention relates to a method for transmitting a television data stream via a wireless network connection. The method comprises receiving at least one television data stream via the User Datagram Protocol (UDP); converting the at least one UDP television data stream into a Transmission Control Protocol (TCP) data stream; and transmitting the TCP data stream via the wireless network connection over a point-to-point link.

15 Claims, 4 Drawing Sheets

METHOD AND DEVICE FOR WIRELESS TRANSMISSIONS OF INTERNET PROTOCOL TV

CROSS REFERENCE TO RELATED APPLICATIONS

This application is the U.S. National Stage of International Application Number PCT/IB2006/001586 filed on Jun. 14, 2006 which was published in English on Dec. 21, 2007 under International Publication Number WO 2007/144682.

TECHNICAL FIELD

The invention relates to Internet protocol television (IPTV), and particularly to methods and devices for transmitting IPTV over wireless networks.

BACKGROUND OF THE INVENTION

Transmitting television (TV) and video on demand signals over the Internet is becoming more and more common. A number of commercial services already exist. IPTV (Internet Protocol Television) describes a system where a digital television service is delivered to subscribing consumers using the Internet Protocol over a broadband connection, e.g. the widely used xDSL connection. This service is often provided in conjunction with Video on Demand and is typically supplied by a broadband operator using the same infrastructure.

IPTV covers both live TV (multicasting) as well as stored video content (Video on Demand, VOD). The playback of IPTV requires either a personal computer device or a set-top box connected to a TV. Video content is typically delivered via IP Multicast, a method in which information can be sent to multiple computers at the same time. In standards-based IPTV systems, the primary underlying protocols used for IPTV are Internet Group Management Protocol (IGMP) version 2 for channel change signaling for live TV and Real Time Streaming Protocol (RTSP) for Video on Demand.

Wireless Local Area Networks (WLAN), Worldwide Interoperability for Microwave Access (WiMAX) and other radio technologies are used to provide wireless Internet access in homes, offices and hot-spots. Generally UDP based multicast/broadcast streaming protocols are used with video signals, as they work much more efficiently compared to the TCP protocol. Also multicasting is not possible with TCP; the re-transmission state machines have to be link specific, i.e. they can not be shared by a high number of receivers as required in video streaming applications. However UDP protocol inherits certain quality issues in wireless connections.

The User Datagram Protocol (UDP) is one of the core protocols of the Internet protocol suite. UDP is defined to make available a datagram mode of packet-switched computer communication in the environment of an interconnected set of computer networks. This protocol requires that the Internet Protocol (IP) is used as the underlying protocol. Using UDP, programs on networked computers can send short messages known as datagrams to one another. UDP does not provide the reliability and ordering that TCP guarantees. That is, datagrams may arrive out of order or even go missing without being noticed. In other words, packets are liable to be lost or corrupted in transit. However, as a result, UDP is faster and more efficient for many lightweight or time-sensitive purposes, as it has a reduced overhead compared to TCP. Therefore, and due to the fact that multicasting is possible with UDP in contrast to TCP, UDP is used in applications as IPTV.

In the UDP protocol packets are sent from the sender to the receiver without feedback about transmission success, that is, some acknowledgement scheme. If the receiver is unable to extract the correct information from the received packet there are no means provided to request a retransmission of the packet. Depending on the extent of the loss the client may be able to recover the data with error correction techniques, may interpolate over the missing data, or may suffer a dropout. In certain applications like Voice over IP a small amount of dropouts may be tolerable compared to time delays due to retransmitted data packets.

Typically in wired Ethernet network these properties of UDP are not a problem, as the transmission media is reliable and relatively insensitive to disturbances. In unmanaged radio connections (such as WLAN) the situation is different. The environment is hostile and the quality of radio links can vary due to a number of different reasons. In addition, the actual throughput is much lower than the theoretical peak bit rate, due to the overhead of lower layers, particularly the preamble needed for L1 synchronization. For these reasons WLAN and other radio technologies have severe quality issues in providing high quality video and IPTV services using the UDP protocol.

Typically the Internet infrastructure is implemented such that WLAN and other radio access technologies are used only for covering the final distance (like last tens of yards) inside a home, office or hot-spot. Connections to radio access points in turn are typically made with xDSL, optical or other wire-based technologies. In prior art situations IPTV terminals are connected to xDSL modems via wire-based Ethernet connections. It would be advantageous to be able to replace such wired connections by WLAN or similar wireless connections, as to these are already widely used in small home or office networks connecting PCs, laptop computers and even PDAs with the Internet in the house or office.

However, the above mentioned problems with IPTV originate from a scenario wherein a WLAN connection shall be used in the Internet connection for IPTV. In contrast to cable connections, wireless connections are less reliable and prone to errors due to signal attenuation, interference generated by other devices using the same un-controlled radio band and multi-path propagation or channel variation, e.g. when the user carrying a portable IPTV playback device is moving around. The UDP protocol that is used in IPTV, however, expects a reliable connection and therefore doesn't provide acknowledgement of received packets. Consequently, packet retransmission is not provided for. Prior art solutions add redundancy to the transmitted signal to recover disturbances. This is done in form of forward error correction and interleaving the TV data over multiple IP packets. This however reduces the throughput capacity of the system. As a native MPEG-2 stream may already require most of e.g. a 8 MBit/s ADSL link, there is not left much reserve capacity for such error correction schemes.

It would be beneficial if IPTV terminals could be connected using a wireless technology such as WLAN as well, but without being subjected to the data corruption which is likely in the combination of WLAN and UDP based video transmission. This would enable wireless access connections to be used also for UDP based TV and video broadcast streams. It could help reduce the expensive cabling which would otherwise be required in homes and offices.

Therefore it is an object of the present invention to provide methods and devices for reliably relaying UDP-based (and probably also multicast) IPTV over wireless IP networks using point-to-point links. The invention may also enable the use of existing IPTV playback hardware/software and be interoperable with existing IPTV providers using broadband Internet connections.

SUMMARY OF THE INVENTION

According to an aspect of the present invention a method for transmitting a television data stream via a wireless network connection is provided, comprising
    receiving at least one television data stream via the User Datagram Protocol (UDP);
    converting said at least one UDP television data stream into a Transmission Control Protocol (TCP) data stream; and
    transmitting said TCP data stream via said wireless network connection via a point-to-point link.

The method of the invention enables to transmit UDP based television data streams via a wireless network in a reliable fashion. Therefore high video quality without artifacts can be ensured. The method can be applied to conventional UDP based IPTV streams, thus interoperability with existing providers is also maintained.

According to an exemplary embodiment the UDP television data stream is a multicast data stream.

According to an exemplary embodiment a plurality of UDP data streams is received, and the method further comprises
    selecting said at least one UDP television data stream from said plurality of UDP data streams.

In case a normal Internet connection is used to receive the IPTV stream it is likely that also other UDP data streams not related to television are received. Therefore this embodiment provides means for selecting the at least one UDP television data stream to be transmitted. Using this embodiment it is also possible to choose between a plurality of incoming UDP television data streams.

According to an exemplary embodiment the method further comprises
    receiving a request for at least one particular television data stream over said wireless network connection;
wherein said selecting of said at least one UDP television data stream is performed according to said request.

This embodiment enables to select a particular television data stream, e.g. from a plurality of television programs. It also provides the possibility to be provided with characteristics to decide which one of a plurality of UDP streams, both television data streams and other UDP data streams, the transmitting end should select for transmission.

Selecting the multicast stream could be based on the peer-to-peer (P2P) link, e.g. opening a TCP connection to a certain TCP port selects a certain UDP (multicast) port on the server or changing the server. Electronic Program Guide (EPG) information contained in the request could also be used to select the actual UDP stream, e.g. a program ID or like.

According to another aspect of the present invention a method for receiving a television data stream via a wireless network connection is provided, comprising
    receiving a TCP data stream carrying at least one UDP television data stream via a wireless network connection;
    extracting at least one UDP television data stream from said TCP data stream; and
    outputting said at least one UDP television data stream.

The method of the invention enables to receive UDP based television data streams carried in a TCP data stream via a wireless network in a reliable fashion. Therefore high video quality without artifacts can be ensured. As this method may be used to also produce a conventional UDP television data stream as output, it can then be used in conjunction with conventional UDP based IPTV playback devices, thus interoperability with existing playback devices and/or software is also maintained.

According to an exemplary embodiment the method further comprises
    transmitting a request for at least one particular television data stream via said wireless network connection.

This request could e.g. comprise opening a TCP connection to a certain TCP port for selecting a certain UDP (multicast) port on the server or changing the server. Electronic Program Guide (EPG) information could also be included in the request for selecting the actual UDP stream, e.g. a program ID or like. This embodiment enables a receiving end to request a particular television data stream, e.g. from a plurality of television programs. It also provides the possibility to provide the transmitting end with characteristics to decide which one of a plurality of UDP streams, both television data streams and other UDP data streams, the transmitting end should select for transmission.

According to yet another aspect of the invention a computer program product is provided, comprising program code means, stored on a computer-readable medium, for instructing a computer to perform the method as described above.

According to still another aspect of the invention a transmission device for transmitting a television data stream via a wireless network connection is provided, comprising
    an interface adapted for receiving at least one television data stream via the User Datagram Protocol (UDP);
    a converter adapted for converting said at least one UDP television data stream into a Transmission Control Protocol (TCP) data stream; and
    a wireless transceiver adapted for transmitting said TCP television data stream via said wireless network connection over a point-to-point link.

According to an exemplary embodiment the interface adapted is adapted for receiving a multicast UDP television data stream.

The interface can be implemented for example as a Digital Subscriber Line (xDSL) interface, cable, Ethernet, optical or other broadband network interface capable of reliably providing UDP television data streams. The wireless transceiver can be provided to operate according to any wireless standard, e.g. WLAN, having a sufficient available bandwidth to transmit the TCP data stream.

According to an exemplary embodiment the transmission device further comprises
    a buffer connected between said interface and said converter, said buffer being adapted for buffering said at least one UDP television data stream.

According to an exemplary embodiment the interface is adapted for receiving a plurality of UDP data streams, and the device further comprises
    a selector adapted for selecting at least one UDP television data stream from said plurality of UDP data streams for said conversion.

According to an exemplary embodiment the wireless transceiver is adapted for receiving a request for at least one particular television data stream, and the selector is adapted for performing said selecting of said at least one UDP television data stream according to said request.

According to an exemplary embodiment the wireless transceiver is a Wireless Local Area Network (WLAN) transceiver.

According to a further aspect of the invention a receiver device for receiving a television data stream via a wireless network connection is provided, comprising
    a wireless transceiver adapted for receiving a TCP data stream carrying at least one television data stream;

a extractor adapted for extracting said at least one television data stream from said TCP data stream;

an output interface for outputting said at least one television data stream.

According to an exemplary embodiment the wireless transceiver is adapted for transmitting a request for at least one particular television data stream.

According to an exemplary embodiment the wireless transceiver is a WLAN transceiver.

According to an exemplary embodiment the device further comprises a playback component connected with said output interface, said playback component being adapted for playing back said television data stream, and at least comprising a display and a loudspeaker.

BRIEF DESCRIPTION OF THE DRAWINGS

The accompanying drawings are provided for illustrating preferred embodiments of the present invention by way of example. They are only illustrative and not intended to restrict the scope of the present invention to the specific embodiments described therein. In the drawings

DETAILED DESCRIPTION OF THE INVENTION

Figure 1:
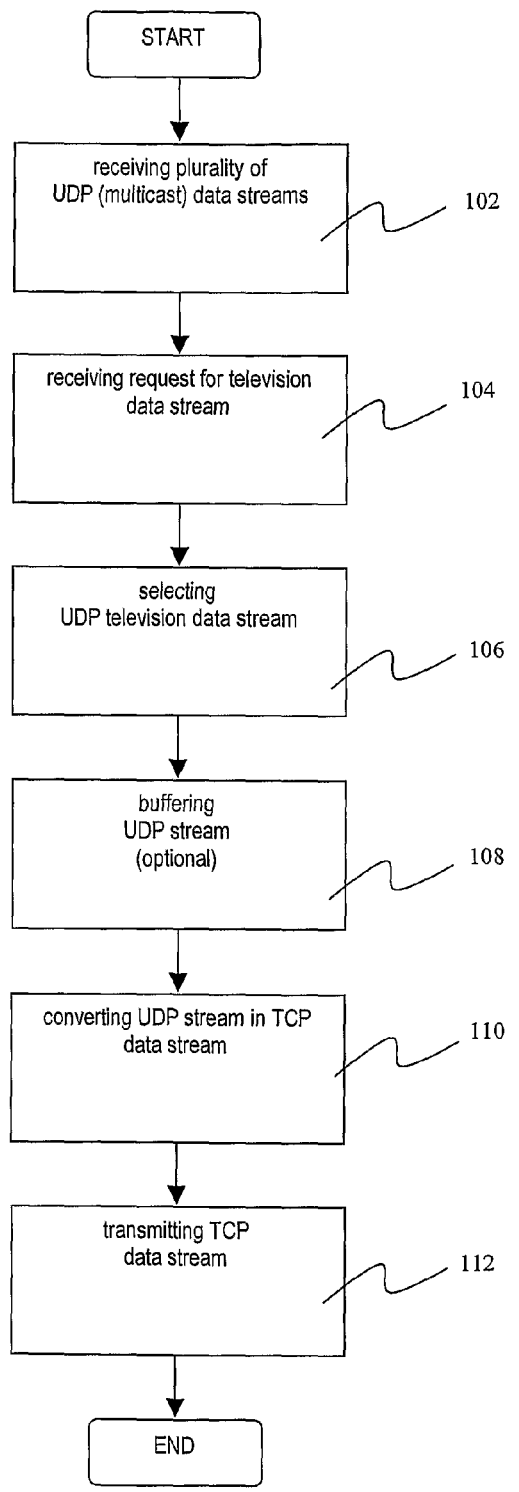
FIG. 1 shows a flow diagram of an embodiment of the method of the invention on the transmitting end.

FIG. 1 is a flow diagram illustrating an embodiment of the method of the present invention, as implemented on the transmitting end. In the first step 102 a plurality of UDP data streams is received. These UDP data streams may include a variety of actual contents, Domain Name Service requests and answers, Voice over IP telephony data and IP television data (which may include one or more multicast UDP television data streams), possibly even of more than one TV broadcast. In these common cases where more than one UDP data stream arrives at the transmitting end, e.g. a wireless router, it is, in the method of the invention, necessary to select at least one UDP television data stream.

Therefore, in step 104 a request for a particular television data stream is received; in advanced embodiments this may include a request for more than one television data stream. This request enables a user to select a particular TV program, or a number of TV programs to be transmitted. According to the request at least one UDP television data stream is selected, in step 106, according to the request. If the request indicates more than one television data stream, the corresponding number of UDP television data stream is selected according to the request.

In step 108 the at least one selected UDP television data stream is optionally buffered$_{[MW1]}$. In another embodiment buffering can also optionally be performed after step 110, that is, on the TCP side.

The conversion into the TCP protocol according to the present invention is performed in step 110. The resulting TCP data stream is then transmitted via a wireless network connection, e.g. WLAN, to be received by a receiver device according to the invention, in step 112.

It should be noted that in step 102 also only a single UDP television data stream may be received. In this case step 104 is omitted. However, there may also be situations where only step 104 is optional, that is, where a plurality of UDP data streams is received, but wherein at least one UDP television data stream is selected by other means. For example, in certain embodiments of the invention it is possible to simply select all television type UDP data streams, omitting DNS related traffic and other non-TV data streams. Furthermore, step 108 is also only optional, as buffering may not always be required or advantageous.

Figure 2:
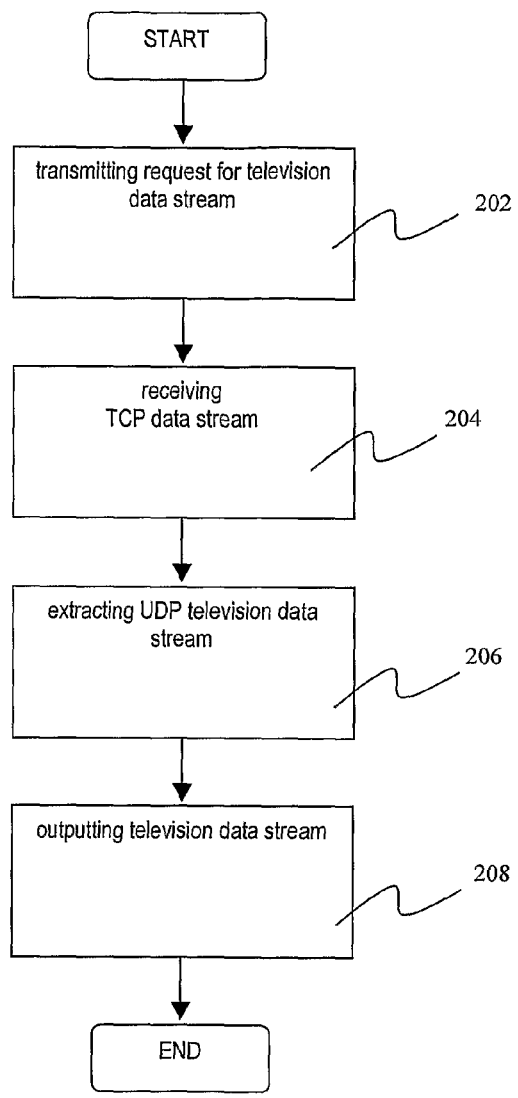
FIG. 2 shows a flow diagram of an embodiment of the method of the invention on the receiving end.

FIG. 2 is a flow diagram illustrating an embodiment of the method of the present invention, as implemented on the receiving end. In the first step 202 a request for a particular television data stream is transmitted, e.g. for choosing a particular TV broadcast. This step is optional, and the request may also indicate more than one TV broadcast/program.

Responsive to the request a TCP data stream will be received in step 204, wherein the requested TV data stream, which according to the present invention is a UDP television data stream, is converted into the TCP protocol. Both sending the request of step 202 as well as receiving the TCP data stream of step 204 are performed via a wireless network connection, e.g. WLAN.

In step 206 the television data stream is extracted or restored from the received TCP data stream. That is, the television data stream is now present in its original form, with respect to the data payload, in which it had arrived at the transmitting end[DM2] (see FIG. 1). This television data stream is then outputted in step 208, for example to be played back by a portable WLAN network device with a display screen and loudspeakers or ear phones. The extracting and/or outputting may optionally be performed via a back-conversion into the UDP protocol, that is, by restoring the original UDP television data stream.

It is an important advantage of the invention that standard IPTV hardware and/or software may be used to actually play back the IPTV stream, though the novel transmission scheme according to the invention is not compatible therewith itself. For example a WLAN-based PDA or like device, which already comprises playback software for playing back UDP based IPTV only has to be refitted in order to support the transmission scheme of the invention, while the playback software may remain unaltered. In other words, the invention can provide a transparent transmission of (also multicast) UDP based IPTV.

Figure 3A:
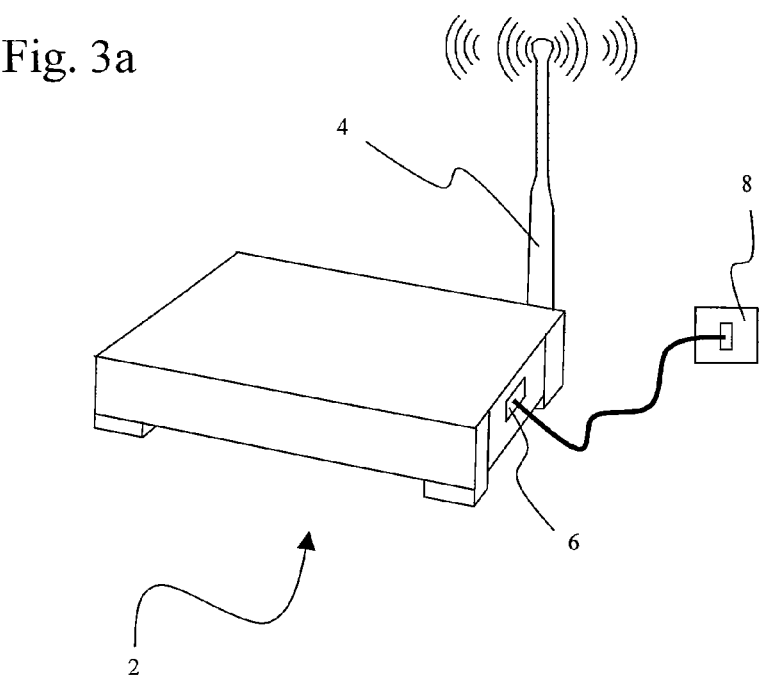
FIGS. 3a and 3b illustrate embodiments of the transmission device according to the invention.

In FIG. 3a a transmission device according to the invention is depicted in a 3-dimensional view. This device may e.g. be implemented in a wireless router or access point 2. The wireless router 2 comprises a wireless network interface 4, illustrated by the antenna, and a fixed broadband Internet connection interface 6, connected with a common Internet access terminal 8. The terminal 8 can be an xDSL connection, a cable connection or other broadband Internet connection. The invention is not restricted to an Internet connection, but may also be used in any other network which can reliably provide UDP television data streams, such as a conventional Ethernet cable network.

Figure 3B:
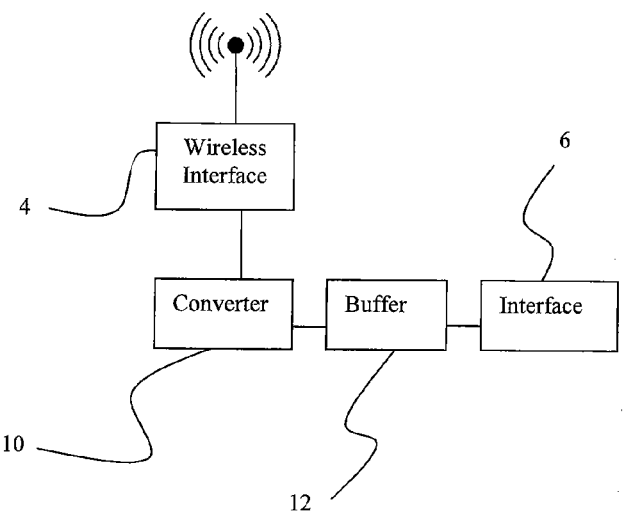

FIG. 3b illustrates the internal components of the device shown in FIG. 3a. The interface 6 as depicted in FIG. 3a is provided for connection with the Internet, or another similar network. It is connected with a converter 10 adapted for converting a UDP television data stream arriving through interface 6 into a TCP data stream. The converter 10 is connected with the wireless interface 4, which is adapted for transmitting the TCP data stream via the wireless network. Optionally a buffer 12 can be provided between converter 10 and interface 6, for buffering UDP television data streams incoming via interface 6, prior to conversion. In another embodiment (not shown) the buffer can optionally be provided on the TCP side, that is, for buffering the converted TCP data stream.

Figure 4A:
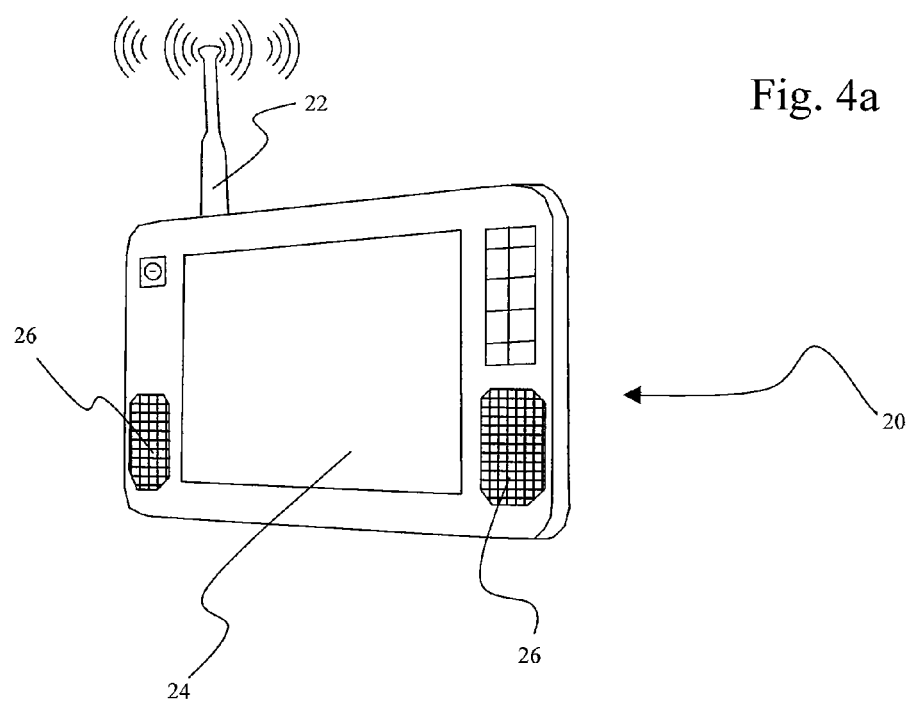
FIGS. 4a and 4b illustrate embodiments of the receiver device according to the invention.

In FIG. 4a a receiver device according to the invention is depicted in a 3-dimensional view. Shown here is a portable WLAN TV terminal device 20; however the invention is not limited thereto, but can be used in conjunction with any portable or stationary IPTV device having a wireless network interface, e.g. mobile phone, PDA, set top box device or laptop computer. The terminal device 20 comprises a display screen 24 and two loudspeakers 26. It also comprises a wireless interface 22, indicated by the antenna.

Figure 4B:
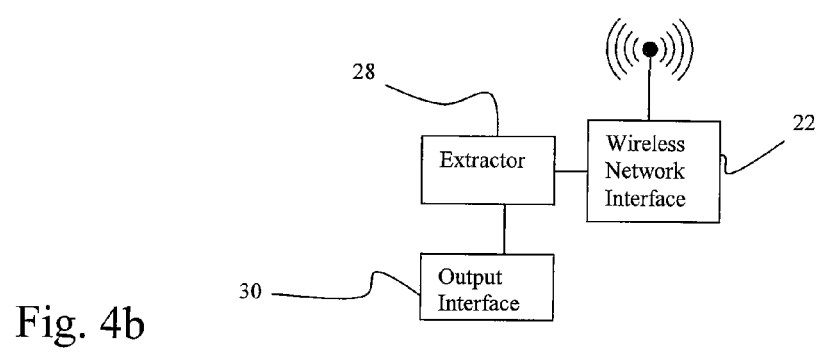

FIG. 4b illustrates the internal components of the device shown in FIG. 4a. The receiver device 20 comprises the wireless network interface 22, e.g. a WLAN transceiver. An extractor 28 is connected therewith, for receiving a TCP data stream incoming via the wireless interface 22. The extractor 28 is adapted for extracting the television data stream which according to the invention is carried within the TCP data stream. The receiver 20 device further comprises an output interface 30, connected with the extractor, for receiving the extracted television data stream. The output interface 30 may be an internal interface, e.g. connected with the display screen 24 and the loudspeakers 26 as shown in FIG. 4a. In another embodiment it may also be an external interface to be connected to a playback device like a standard TV set, e.g. comprising an S-VIDEO and audio cinch connectors, SCART or the like. In this case the receiver device is just a reception module for forwarding the wirelessly received television data stream to a playback device e.g. via a HDMI or DVI interface. For analog playback devices as conventional television sets a suitable AV decoders and digital/analog converter may be provided.

It should be noted that in the above explained exemplary embodiments certain components have been omitted to improve the intelligibility, for example a power supply. As such are per se known and not essential for the understanding of the present invention, they will not be discussed in detail. E.g. a suitable power supply may be a conventional Li Ion accumulator (in a PDA or other portable IPTV playback device) or a wall plug transformer (in a wireless router or access point).

According to the invention the relaying of (also multicast) UDP-based IPTV traffic is performed by converting the UDP protocol used in IPTV distribution into a TCP-based protocol for the radio link. This is feasible when the radio connection has a capacity that is sufficient for the TCP protocol. In home environments this is typically the case, as radio connection transmission rates are usually high (common WLAN standards as 802.11 A, B, G offer maximal bandwidths of 11 Mbit/s, 54 Mbit/s and 108 Mbit/s) compared to the typical xDSL transmission capacity (256 kbit/s up to 8 Mbit/s and above). According to the invention the UDP to TCP protocol conversion can be performed in a wireless router, wireless access point or a multimedia PC. To be able to handle this conversion the router has to know which UDP streams are to be converted into TCP streams. For that reason a specific functionality has to be built into the router or wireless access point.

Normally an IPTV viewing terminal signals to an IPTV server and multicast routers on the path about which TV-channels or programs it is interested in, and then the IPTV server starts to multicast the desired program to the IPTV terminal using an UDP stream. Typically IGMP is used to open the multicast stream to be fed onto the local connection.

In this invention the wireless router receives the IPTV stream from the IPTV server. Then it (optionally) forwards the UDP stream to those connections that can reliably handle UDP streams (e.g. fixed connections). For wireless connections the wireless router buffers the UDP stream, converts it into a TCP-based data stream and relays the stream onto the wireless connections, e.g. WLAN. As the transmission capacity of the wireless link is higher than the xDSL connection the TCP protocol can handle the required retransmissions when errors occur on the wireless connection. That guarantees high video end quality.

The IPTV terminal, that is, receiver device according to this invention, can handle TCP-based TV data streams and is able to receive the actual TCP TV stream from a wireless router or transmission device, respectively. The receiver device is capable of indicating to the router that it requires a TCP stream instead of a UDP stream. This may include requesting from the router which one of a plurality of incoming UDP data streams is to be selected or "picked up" for the IPTV transmission according to the invention. As the Internet connection will usually be shared between IPTV and conventional Internet traffic this may be necessary in situations wherein there are a number of UDP streams some of which are not television data streams.

What is claimed is:

1. A method for transmitting and receiving a television data stream via a wireless network connection, comprising:
   receiving at least one television data stream via the user datagram protocol;
   converting said at least one user datagram protocol television data stream into a transmission control protocol data stream;
   transmitting said transmission control protocol data stream via said wireless network connection over a point-to-point link;
   receiving said transmission control protocol data stream carrying said at least one user datagram protocol television data stream via said wireless network connection;
   extracting said at least one user datagram protocol television data stream from said transmission control protocol data stream by restoring the original user datagram protocol television data stream; and
   outputting said at least one user datagram protocol television data stream as a conventional user datagram protocol television data stream for being used in conjunction with conventional user datagram protocol based IPTV playback devices.

2. The method according to claim 1, wherein said user datagram protocol television data stream is a multicast data stream.

3. The method according to claim 1, wherein a plurality of user datagram protocol data streams is received, further comprising:
   selecting said at least one user datagram protocol television data stream from said plurality of user datagram protocol data streams.

4. The method according to claim 3, further comprising:
   receiving a request for at least one particular television data stream over said wireless network connection;
   wherein said selecting of said at least one user datagram protocol television data stream is performed according to said request.

5. The method according to claim 1, further comprising:
   transmitting a request for at least one particular television data stream via said wireless network connection.

6. A non-transitory computer-readable medium stored with program code, for instructing a computer to perform the method of claim 1.

7. A system for transmitting and receiving a television data stream via a wireless network connection, comprising:
- an interface configured to receive at least one television data stream via the user datagram protocol;
- a converter configured to convert said at least one user datagram protocol television data stream into a transmission control protocol data stream;
- a wireless transceiver configured to transmit said transmission control protocol television data stream via said wireless network connection over a point-to-point link;
- a wireless transceiver configured for receiving said transmission control protocol data stream carrying said at least one user datagram protocol television data stream;
- an extractor configured for extracting said at least one user datagram protocol television data stream from said transmission control protocol data stream by restoring the original user datagram protocol television data stream; and
- an output interface for outputting said at least one user datagram protocol television data stream as a conventional user datagram protocol television data stream for being used in conjunction with conventional user datagram protocol based IPTV playback devices.

8. The system according to claim 7, wherein said interface configured to receive a multicast user datagram protocol television data stream.

9. The system according to claim 7, wherein said interface is a digital subscriber line interface.

10. The system according to claim 7, wherein said interface is configured to receive a plurality of user datagram protocol data streams, the device further comprising:
- a selector configured to select at least one user datagram protocol television data stream from said plurality of user datagram protocol data streams for said conversion.

11. The system according to claim 7, wherein said wireless transceiver is configured to receive a request for at least one particular television data stream, and wherein said selector is configured to perform said selecting of said at least one user datagram protocol television data stream according to said request.

12. The system according to claim 7, wherein said wireless transceiver is a wireless local area network transceiver.

13. The system according to claim 7, wherein said wireless transceiver is configured to transmit a request for at least one particular television data stream.

14. The system according to claim 7, wherein said wireless transceiver is a wireless local area network transceiver.

15. The system according to claim 7, further comprising:
- a playback component connected with said output interface, said playback component being configured to play back said television data stream, and at least comprising a display and a loudspeaker.

* * * * *